US00RE48552E

(19) United States
(12) Reissued Patent
Kakkori

(10) Patent Number: US RE48,552 E
(45) Date of Reissued Patent: *May 11, 2021

(54) METHOD AND SYSTEM FOR IMAGE CONSTRUCTION USING MULTIPLE EXPOSURES

(71) Applicant: Nokia Technologies Oy, Espoo (FI)

(72) Inventor: Hannu Kakkori, Tampere (FI)

(73) Assignee: NOKIA TECHNOLOGIES OY, Espoo (FI)

( * ) Notice: This patent is subject to a terminal disclaimer.

(21) Appl. No.: 15/351,832

(22) Filed: Nov. 15, 2016

Related U.S. Patent Documents

Reissue of:
(64) Patent No.: 7,952,612
Issued: May 31, 2011
Appl. No.: 11/474,047
Filed: Jun. 22, 2006

U.S. Applications:
(63) Continuation of application No. 13/904,351, filed on May 29, 2013, now Pat. No. Re. 46,239, which is an application for the reissue of Pat. No. 7,952,612.

(51) Int. Cl.
*H04N 5/228* (2006.01)
*H04N 5/232* (2006.01)
*H04N 7/14* (2006.01)

(52) U.S. Cl.
CPC ..... *H04N 5/23248* (2013.01); *H04N 5/23232* (2013.01); *H04N 5/23258* (2013.01); *H04N 5/23277* (2013.01); *H04N 2007/145* (2013.01)

(58) Field of Classification Search
CPC ..... H04N 5/23232; H04N 5/23258; H04N 5/23277; H04N 5/23248; H04N 2007/145
See application file for complete search history.

(56) References Cited

U.S. PATENT DOCUMENTS 5,771,404 A * 6/1998 Katayama et al. ..... 396/52
6,044,228 A * 3/2000 Hara et al. ..... 396/55
(Continued)

FOREIGN PATENT DOCUMENTS

CN 1638440 A 7/2005
EP 1304872 A1 4/2003
(Continued)

OTHER PUBLICATIONS

Microsoft Press Computer Dictionary , 2nd Edition, Microsoft Press, Redmond, WA, 1994.*
(Continued)

*Primary Examiner* — Yuzhen Ge
(74) *Attorney, Agent, or Firm* — Alston & Bird LLP

(57) ABSTRACT

A motion sensor is used to sense the movement of the camera during an exposure period. The camera has an image sensor to form one or more exposures. When the movement is within a certain range, the exposures are used to provide one or more frames so that an image can be constructed based on the frames. In one embodiment, the exposure period is divided into several short intervals in order to capture several image frames and only the image frames captured when the position of the camera is within a predetermined range are used to form the final image. The exposure time for each frame is small in order to reduce the motion blur degradation of the individual frames. If the camera is stable and substantially stationary relative to the scene, then all or many of the shorter frames are used to form the final image.

9 Claims, 6 Drawing Sheets

(56) References Cited

U.S. PATENT DOCUMENTS

| | | | | |
|---|---|---|---|---|
| 6,345,152 | B1 * | 2/2002 | Sato | 396/52 |
| 6,487,369 | B1 * | 11/2002 | Sato | 396/52 |
| 6,731,799 | B1 | 5/2004 | Sun et al. | |
| 7,209,601 | B2 | 4/2007 | Manabe | 382/294 |
| 7,307,653 | B2 | 12/2007 | Dutta | 348/208.7 |
| 7,952,612 | B2 | 5/2011 | Kakkori | |
| RE46,239 | E * | 12/2016 | Kakkori | G03B 7/00 |
| 2002/0097324 | A1 * | 7/2002 | Onuki | H04N 5/2259 348/208.99 |
| 2003/0151688 | A1 | 8/2003 | Tojo | |
| 2004/0130628 | A1 * | 7/2004 | Stavely | H04N 5/23248 348/208.4 |
| 2004/0160525 | A1 | 8/2004 | Kingetsu et al. | 348/364 |
| 2004/0239775 | A1 * | 12/2004 | Washisu | H04N 5/23248 348/239 |
| 2005/0248660 | A1 * | 11/2005 | Stavely et al. | G03B 39/00 348/208.16 |
| 2006/0098237 | A1 * | 5/2006 | Steinberg | H04N 5/23212 358/302 |
| 2006/0165395 | A1 * | 7/2006 | Shimano | G06T 3/608 396/54 |
| 2006/0182430 | A1 * | 8/2006 | Stavely | G03B 7/003 396/52 |
| 2007/0014554 | A1 | 1/2007 | Sasaki et al. | |
| 2007/0237506 | A1 * | 10/2007 | Minema | G03B 7/093 396/52 |
| 2008/0052090 | A1 | 2/2008 | Heinemann et al. | |
| 2009/0009612 | A1 | 1/2009 | Tico et al. | 348/208.1 |
| 2009/0115860 | A1 * | 5/2009 | Nakashima | H04N 5/23248 348/208.99 |
| 2009/0175496 | A1 | 7/2009 | Kondo et al. | |

FOREIGN PATENT DOCUMENTS

| | | | |
|---|---|---|---|
| EP | 1501288 | A2 | 1/2005 |
| GB | 2253067 | A | 8/1992 |
| JP | 09-005816 | | 1/1997 |
| JP | H11317904 | A | 11/1999 |
| JP | 2001-166351 | | 6/2001 |
| JP | 2002-116477 | A | 4/2002 |
| JP | 2002-118780 | A | 4/2002 |
| JP | 2002-311471 | A | 10/2002 |
| JP | 2003-101862 | | 4/2003 |
| JP | 2003-101862 | A | 4/2003 |
| JP | 2004-007220 | A | 1/2004 |
| JP | 2004-201247 | A | 7/2004 |
| JP | 2004-312663 | A | 11/2004 |
| JP | 2005-197911 | A | 7/2005 |
| WO | WO 2007/031808 | A1 | 3/2007 |

OTHER PUBLICATIONS

Advisory Action for U.S. Appl. No. 11/474,047 dated Mar. 8, 2010.
Advisory Action for U.S. Appl. No. 13/904,351 dated Apr. 2, 2014.
Advisory Action for U.S. Appl. No. 13/904,351 dated Jan. 30, 2015.
Advisory Action for U.S. Appl. No. 13/904,351 dated Oct. 26, 2015.
Notice of Allowance for U.S. Appl. No. 11/474,047 dated May 9, 2011.
Notice of Allowance for U.S. Appl. No. 13/904,351 dated Nov. 2, 2016.
Office Action for U.S. Appl. No. 11/474,047 dated Apr. 15, 2010.
Office Action for U.S. Appl. No. 11/474,047 dated Dec. 17, 2009.
Office Action for U.S. Appl. No. 11/474,047 dated Jun. 30, 2009.
Office Action for U.S. Appl. No. 11/474,047 dated Sep. 29, 2010.
Office Action for U.S. Appl. No. 13/904,351 dated Aug. 14, 2014.
Office Action for U.S. Appl. No. 13/904,351 dated Dec. 4, 2014.
Office Action for U.S. Appl. No. 13/904,351 dated Feb. 3, 2016.
Office Action for U.S. Appl. No. 13/904,351 dated Jan. 27, 2014.
Office Action for U.S. Appl. No. 13/904,351 dated Jul. 16, 2015.
Office Action for U.S. Appl. No. 13/904,351 dated Mar. 25, 2015.
Office Action for U.S. Appl. No. 13/904,351 dated Oct. 9, 2013.
International Search Report and Written Opinion for Application No. PCT/IB2007/001174 dated Oct. 16, 2007, 9 pages.
Extended European Search Report for Application No. EP 11 19 2332 dated Feb. 3, 2012.
European Search Report for Application No. EP 07 73 4490 dated Nov. 13, 2009, 3 pages.
Office Action for European Application No. 07 734 490.1 dated Dec. 7, 2009, 5 pages.
Office Action for European Application No. 07 734 490.1 dated Feb. 2, 2012, 4 pages.
Decision to Grant for European Application No. 07 734 490.1 dated Aug. 14, 2014, 2 pages.

* cited by examiner

FIG. 1
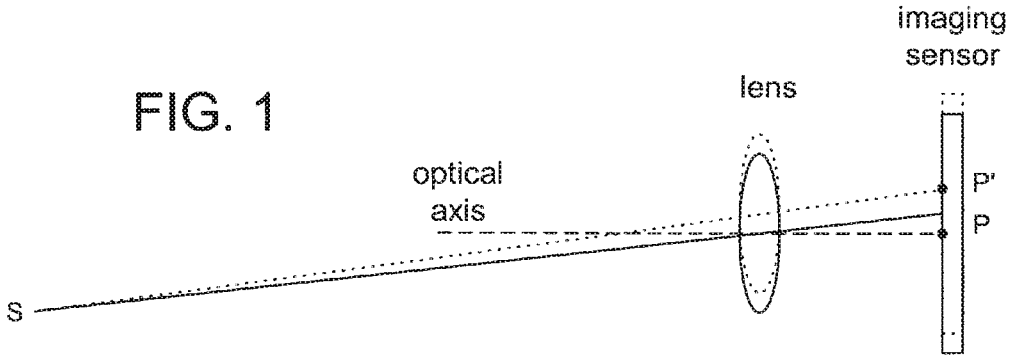
FIG. 2
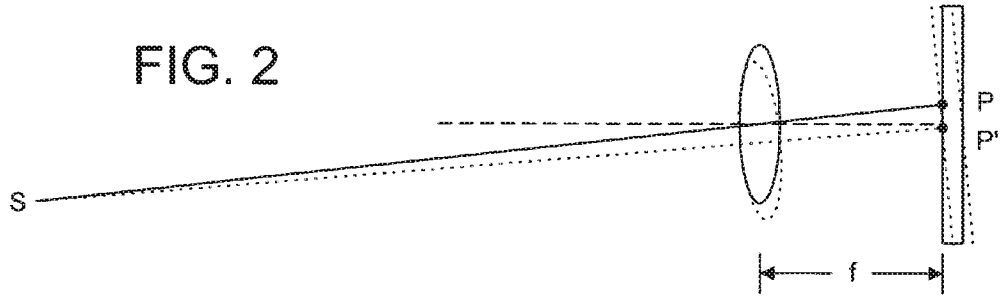
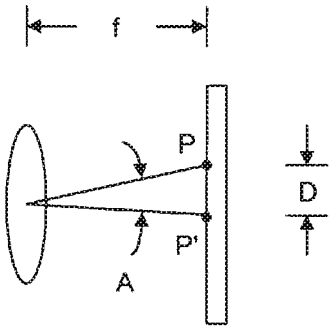
FIG. 3
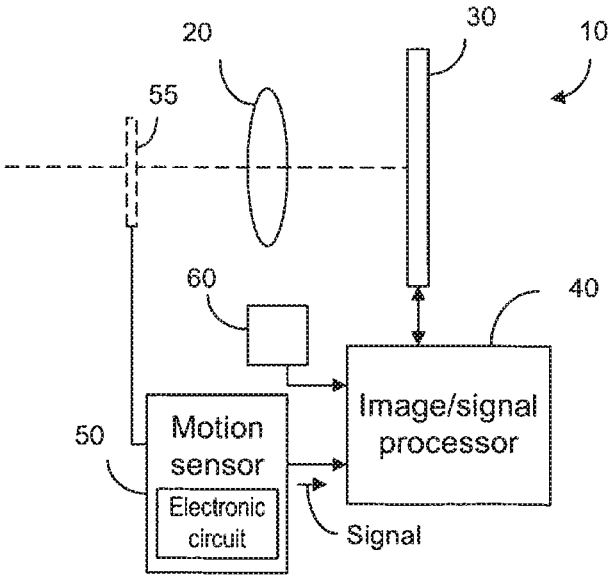
FIG. 8

METHOD AND SYSTEM FOR IMAGE CONSTRUCTION USING MULTIPLE EXPOSURES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is an application for reissue of U.S. Pat. No. 7,952,612, entitled "Method and System for Image Construction Using Multiple Exposures," filed as U.S. patent application Ser. No. 11/474,047 on Jun. 22, 2006 and a continuation of U.S. patent application Ser. No. 13/904,351, entitled "Method and System for Image Construction Using Multiple Exposures," which was filed as a reissue of U.S. Pat. No. 7,952,612 on May 29, 2013 and issued as U.S. Pat. No. RE46,239 on Dec. 13, 2016. More than one application has been filed for the reissue of U.S. Pat. No. 7,952,612, entitled "Method and System for Image Construction Using Multiple Exposures," filed as U.S. patent application Ser. No. 11/474,047 on Jun. 22, 2006. The above-identified applications are herein incorporated by reference in their entirety.*

FIELD OF THE INVENTION

The present invention relates generally to image stabilization and, more particularly, to image stabilization by image processing.

BACKGROUND OF THE INVENTION

The problem of image stabilization dates back to the beginning of photography, and the problem is related to the fact that an image sensor needs a sufficient exposure time to form a reasonably good image. Any motion of the camera during the exposure time causes a shift of the image projected on the image sensor, resulting in a degradation of the formed image. The motion related degradation is called motion blur. Using one or both hands to hold a camera while taking a picture, it is almost impossible to avoid an unwanted camera motion during a reasonably long exposure or integration time. Motion blur is particularly easy to occur when the camera is set at a high zoom ratio when even a small motion could significantly degrade the quality of the acquired image. One of the main difficulties in restoring motion blurred images is due to the fact that the motion blur is different from one image to another, depending on the actual camera motion that took place during the exposure time.

The ongoing development and miniaturization of consumer devices that have image acquisition capabilities increases the need for robust and efficient image stabilization solutions. The need is driven by two main factors:

1. Difficulty to avoid unwanted motion during the integration time when using a small hand-held device (like a camera phone).

2. The need for longer integration times due to the small pixel area resulting from the miniaturization of the image sensors in conjunction with the increase in image resolution.

The smaller the pixel area the fewer photons per unit time could be captured by the pixel such that a longer integration time is needed for good results.

Image stabilization is usually carried out in a technique called a single-frame solution. The single-frame solution is based on capturing a single image frame during a long exposure time. This is actually the classical case of image capturing, where the acquired image is typically corrupted by motion blur, caused by the motion that has taken place during the exposure time. In order to restore the image it is necessary to have very accurate knowledge about the motion that took place during the exposure time. Consequently this approach might need quite expensive motion sensors (gyroscopes), which, apart of their costs, are also large in size and hence difficult to include in small devices. In addition, if the exposure time is long then the position information derived from the motion sensor output exhibits a bias drift error with respect to the true value. This error accumulates in time such that at some point may affect significantly the outcome of the system.

In the single-frame solution, a number of methods have been used to reduce or eliminate the motion blur. Optical image stabilization generally involves laterally shifting the image projected on the image sensor in compensation for the camera motion. Shifting of the image can be achieved by one of the following four general techniques:

Lens shift—this optical image stabilization method involves moving one or more lens elements of the optical system in a direction substantially perpendicular to the optical axis of the system;

Image sensor shift—this optical image stabilization method involves moving the image sensor in a direction substantially perpendicular to the optical axis of the optical system;

Liquid prism—this method involves changing a layer of liquid sealed between two parallel plates into a wedge in order to change the optical axis of the system by refraction; and Camera module tilt—this method keeps all the components in the optical system unchanged while tilting the entire module so as to shift the optical axis in relation to a scene.

In any one of the above-mentioned image stabilization techniques, an actuator mechanism is required to effect the change in the optical axis or the shift of the image sensor. Actuator mechanisms are generally complex, which means that they are expensive and large in size.

Another approach to image stabilization is the multi-frame method. This method is based on dividing a long exposure time into several shorter intervals and capturing several image frames of the same scene in those shorter intervals. The exposure time for each frame is small in order to reduce the motion blur degradation of the individual frames. After capturing all these frames, the final image is calculated in two steps:

Registration step: register all image frames with respect to one of the images chosen as reference, and Pixel fusion: calculate the value of each pixel in the final image based on the corresponding values in all individual frames. One simple method of pixel fusion could be to calculate the final value of each pixel as the average of its values in the individual frames.

The main problems in a typical multi-frame image stabilization solution include:

1. Complex computation in image registration, and
2. Moving objects in the scene: If there are objects in the scene that are moving during the time the image frames are acquired, these objects are distorted in the final image. The distortion consists in pasting together multiple instances of the objects.

It is desirable to provide a simpler method and system for image stabilization.

SUMMARY OF THE INVENTION

The present invention relates to the multi-frame method based on capturing a single image frame or several image frames of the same scene in shorter intervals. The number of captured frames is determined by the motion blur caused by the camera motion and the implementation of embodiments.

According to one embodiment of the present invention, a long exposure time is divided into several short intervals in order to capture a plurality of image frames and only the image frames that are captured when the position of the camera is within a predetermined range are used to form a final image. The exposure time for each frame is small in order to reduce the motion blur degradation of the individual frames. If the camera is stable and substantially stationary relative to the scene, then all or many of the shorter frames are used to form the final image. If the camera is not sufficiently stable, then one or a few shorter frames are used.

According to other embodiments, the duration of exposures to the image sensor is determined by the camera motion during the exposures. Multiple captured frames from multiple exposures may be used to form a final image. Alternatively, only a single frame is captured from the multiple exposures and that single frame is used to form the final image.

If multiple frames are used to form the final image, the pixel intensity values of the corresponding pixels in the frames are summed in order to obtain the final image. The summing process can be done in the image sensor or in a processor.

The present invention uses a motion sensor to sense the camera movement during the exposure time. If the camera movement exceeds a predetermined range relative to a reference point, then the shorter frames captured during this large movement period are discarded. Alternatively, the image sensor is effectively not exposed during a large movement period. The exposing light can be shut off by a mechanical shutter, by an optical valve or by an electronic circuit in the image sensor. With the frame selection or with the selective exposure method of the present invention, there is no need to optically or electronically shift the images captured in the shorter frames in the pixel fusion process.

Thus, it is a first aspect of the present invention to provide a method to stabilize an image acquired in an imaging system during an exposure period. The method comprises:

exposing a projected image on an image sensor of the imaging system at least part of the exposure period for attaining one or more exposures;

sensing movement of the imaging system during the exposure period for obtaining a movement amount relative to an initial position of the imaging system in the exposure period; and constructing the acquired image based on one or more exposures attained when the movement amount is within a predetermined movement range in the exposure period.

According to one embodiment, the one or more exposures attained when the movement amount is within the predetermined movement range form a single image frame during the exposure period, and the method further comprises capturing the single image frame after the exposure period for constructing the acquired image.

According to another embodiment, one or more exposures attained when the movement amount is within the predetermined movement range separately form one or more image frames during the exposure period, and the method further comprises capturing the image frames at least during the exposure period for constructing the acquired image.

According to a different embodiment, the exposure period is divided into a plurality of shorter time periods and said one or more exposures attained during at least part of the exposure period form one or more image frames, each image frame for one shorter time period, said method further comprising capturing said one or more image frames at least during the exposure period; and selecting the captured image frames formed from the one or more exposures when the movement amount is within the predetermined movement range for constructing the acquired image.

It is a second aspect of the present invention to provide an imaging system which comprises:

an image sensor for attaining one or more exposures during an exposure period;

a movement sensor for sensing movement of the imaging system during the exposure period for obtaining a movement amount relative to an initial position of the imaging system in the exposure period; and a processor, operatively connected to the image sensor, for constructing an image based on one or more exposures attained when the movement amount is within a predetermined movement range.

The imaging system further comprises an optical system for providing a projected image on the image sensor so as to allow the image sensor to attain the one or more exposures during the exposure period, and a shutter, positioned in relationship to the optical system, for preventing the projected image from reaching the image sensor when the movement amount is outside the predetermined movement range Alternatively, the imaging system further comprises an electronic circuit operatively connected to the image sensor for preventing the image sensor from attaining an exposure when the movement amount is outside the predetermined movement range. The electronic circuit can provide a signal to indicate whether the movement amount is within the predetermined movement range so as to allow the image sensor to attain said one or more exposures only when the movement amount is within the predetermined range.

It is a third aspect of the present invention to provide an image stabilization module for use in an imaging system, wherein the imaging system comprises an image sensor, an optical module for projecting an image on the image sensor so as to allow the image sensor to attain one or more exposures during an exposure period, and a processor, operatively connected to the image sensor, for constructing an image based on one or more exposures. The image stabilization module comprises:

a movement sensor for sensing movement of the imaging system during the exposure period; and means, operatively connected to the movement sensor, for determining a movement amount of the imaging system relative to an initial position of the imaging system in the exposure period, and for providing a signal indicative of wherein the movement amount is within a predetermined movement range to the processor so that the processor attains the one or more exposures only when the movement amount is within the predetermined range.

It is possible that a light shutter is used for preventing the projected image from reaching the image sensor when the movement amount is out of the predetermined movement range.

The present invention will become apparent upon reading the description taken in conjunction with FIGS. 1 to 9.

BRIEF DESCRIPTION OF THE DRAWINGS

FIG. 1 shows a shift in the image on the image sensor due to a linear movement of the camera.

FIG. 2 shows a shift in the image on the image sensor due to a rotational movement of the camera.

FIG. 3 shows the relationship of the distance of an image shift to the angular change of the image shift.

FIG. 8 is a schematic representation showing the motion stabilization system, according to the present invention.

DETAILED DESCRIPTION OF THE INVENTION

Figure 4A:
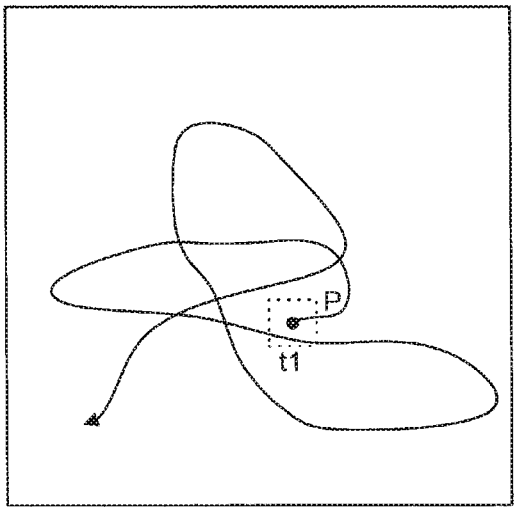
FIG. 4a illustrates a track of a projected image spot on the image plane due to the camera movement.

Using a small hand-held device, such as camera phone to take a picture, the movement of the device relative to a scene is most of the time unavoidable. If the exposure time is long, image blur occurs. Image blur is the result of the image shift in the image plane. As shown in FIG. 1, an image point P on the image sensor is shifted to point P' due to a linear movement of the camera relative to a point S in the scene. FIG. 2 shows the image shift due to a rotational movement of the camera relative to point S. If the image shift distance, D, between point P and point P' is larger than three or four pixels, then the image quality may be poor. Thus, it is desirable to limit the camera movement such that the image shift is within a predetermined range, say one or two pixels. The image shift distance not only varies with the camera movement, but also with the focal distance, f, between the image plane and the lens. In a camera with a zoom lens, the image shift distance is greater when the lens is zoomed out.

The image shift distance, D, can be related to a shift angle, $\alpha$, as shown in FIG. 3. The shift angle, $\alpha$, is approximately equal to D/f. With the same amount of camera movement, the shift angle, $\alpha$, does not significantly change with the focal distance, f.

If the camera is not stable during the long exposure time, an image point P in the image plane may move around responding to the camera movement relative to the scene. In general, the user of the camera tries to aim the camera at the scene. Thus, although the camera moves during the long exposure time, the same image does not wander very far from the image point P. FIGS. 4a to 4d illustrate a track of an image point during the long exposure time. When the track crosses itself, this indicates that the camera moves back to the same aiming direction or position after moving away from it. However, the track may or may not cross the initial image point P.

The image stabilization method, according to the present invention, relates to the multi-frame method based on capturing a single image frame or several image frames of the same scene in shorter intervals. The number of captured frames is determined by the motion blur caused by the camera motion and the implementation of embodiments.

According to one embodiment of the present invention, a long exposure time is divided into a plurality of several short intervals in order to capture a plurality of image frames and only the image frames captured when the position of the camera is within a predetermined range are used to form a final image. The exposure time for each frame is small in order to reduce the motion blur degradation of the individual frames. If the camera is stable and substantially stationary relative to the scene, then all or many of the shorter frames are used to form the final image. If the camera is not sufficiently stable, then one or a few shorter frames are used.

According to other embodiments, the duration of exposures to the image sensor is determined by the camera motion during the exposures. Multiple captured frames from multiple exposures may be used to form a final image. Alternatively, only a single frame is captured from the multiple exposures and that single frame is used to form the final image.

As shown in FIG. 4a, although the track does not pass the image point P during a certain exposure time, it may pass through the pixel where the image point P is initially located. The pixel is indicated by the area defined by a dotted rectangle and the track passes through the pixel at $t_1$. In this case, at least the initial shorter frame and the shorter frame at $t_1$ can be used to form the final image. Let us call the area defined by the dotted rectangle a "wanted exposure area".

Figure 4B:
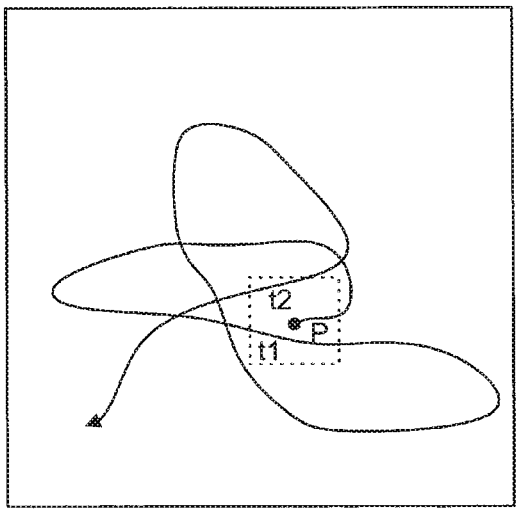
FIG. 4b illustrates the track of a projected image spot on the image plane and a different wanted exposure area.

According to the present invention, some or all of the shorter frames in which the track of an image point passes through the wanted exposure area are used to form the final image. The sharpness of the final image depends upon how large the wanted exposure area is. In a digital camera, the smaller wanted exposure area is a pixel. However, the wanted exposure area can be larger than a pixel. When the wanted exposure area is increased, it is more likely that the track passes through the wanted exposure area. As shown in FIG. 4b, the track passes the wanted exposure area again at $t_2$. Thus, at least three shorter frames can be used to form the final image.

Figure 4C:
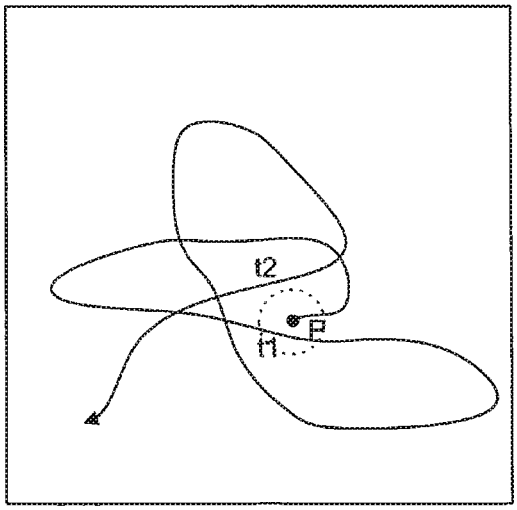
FIG. 4c illustrates the track of a projected image spot on the image plane and another wanted exposure area.
Figure 4D:
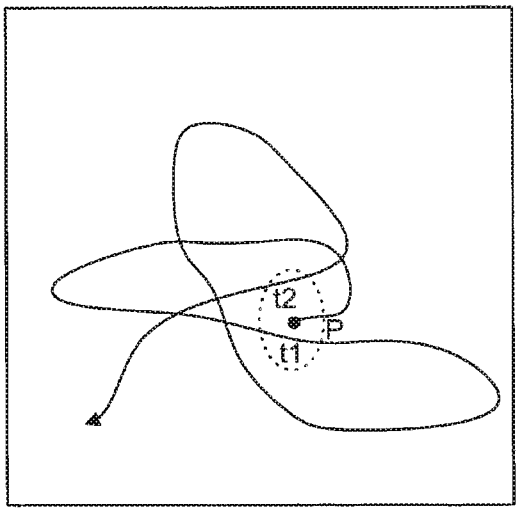
FIG. 4d illustrates the track of a projected image spot on the image plane and yet another wanted exposure area.

Alternatively, a wanted exposure angular range, instead of the wanted exposure area, can be used for selecting shorter frames in forming the final image. The wanted exposure angular range can be defined by the wanted exposure area divided by the focal distance, f, of the camera. In FIG. 4c, the wanted exposure angular range is bound by a dotted circle. In FIG. 4d, the wanted exposure angular range is bound by a dotted ellipse.

Figure 5:
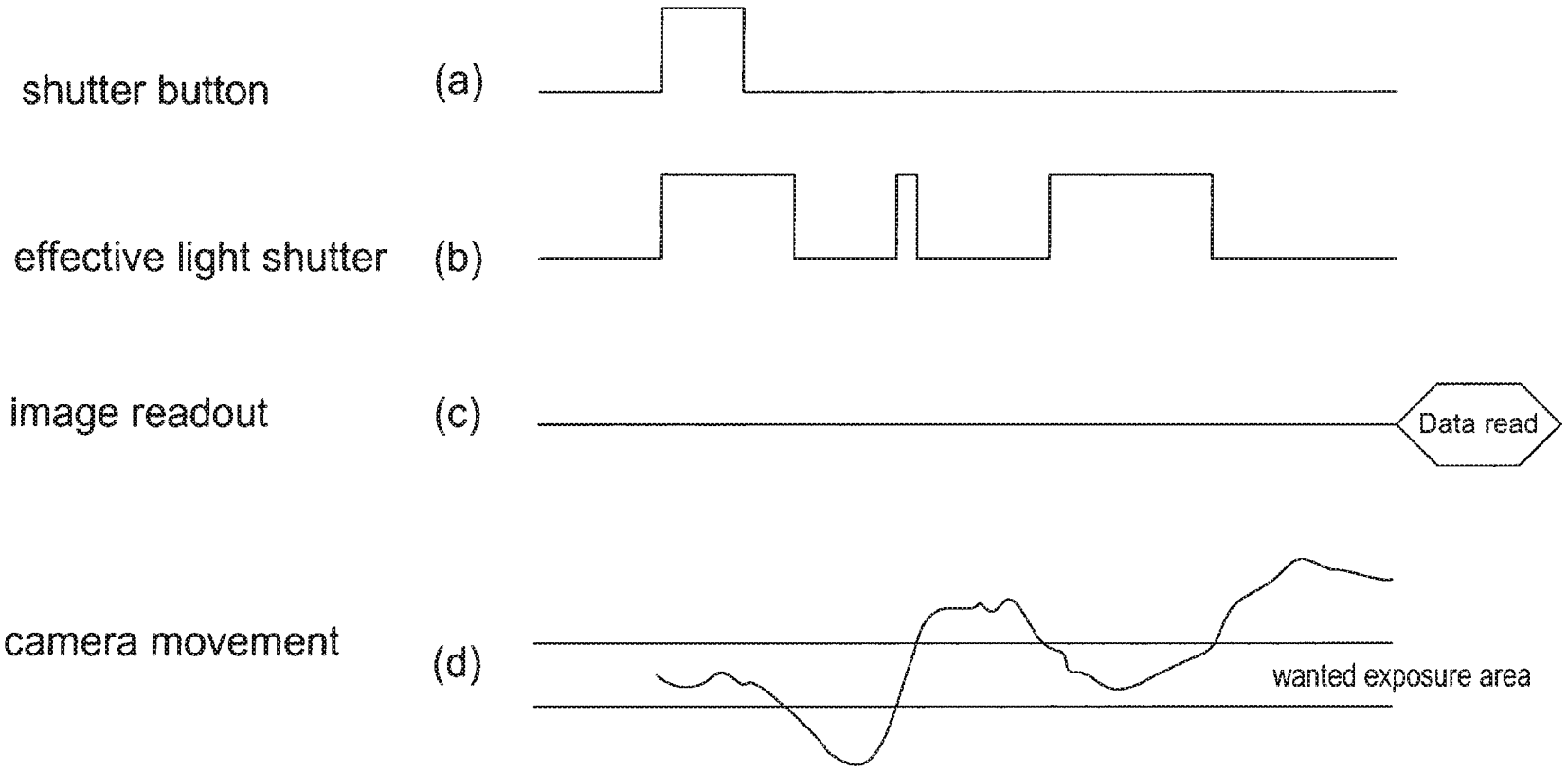
FIG. 5 is a time-chart illustrating how the exposures are read out, according to one embodiment of the present invention.
Figure 6:
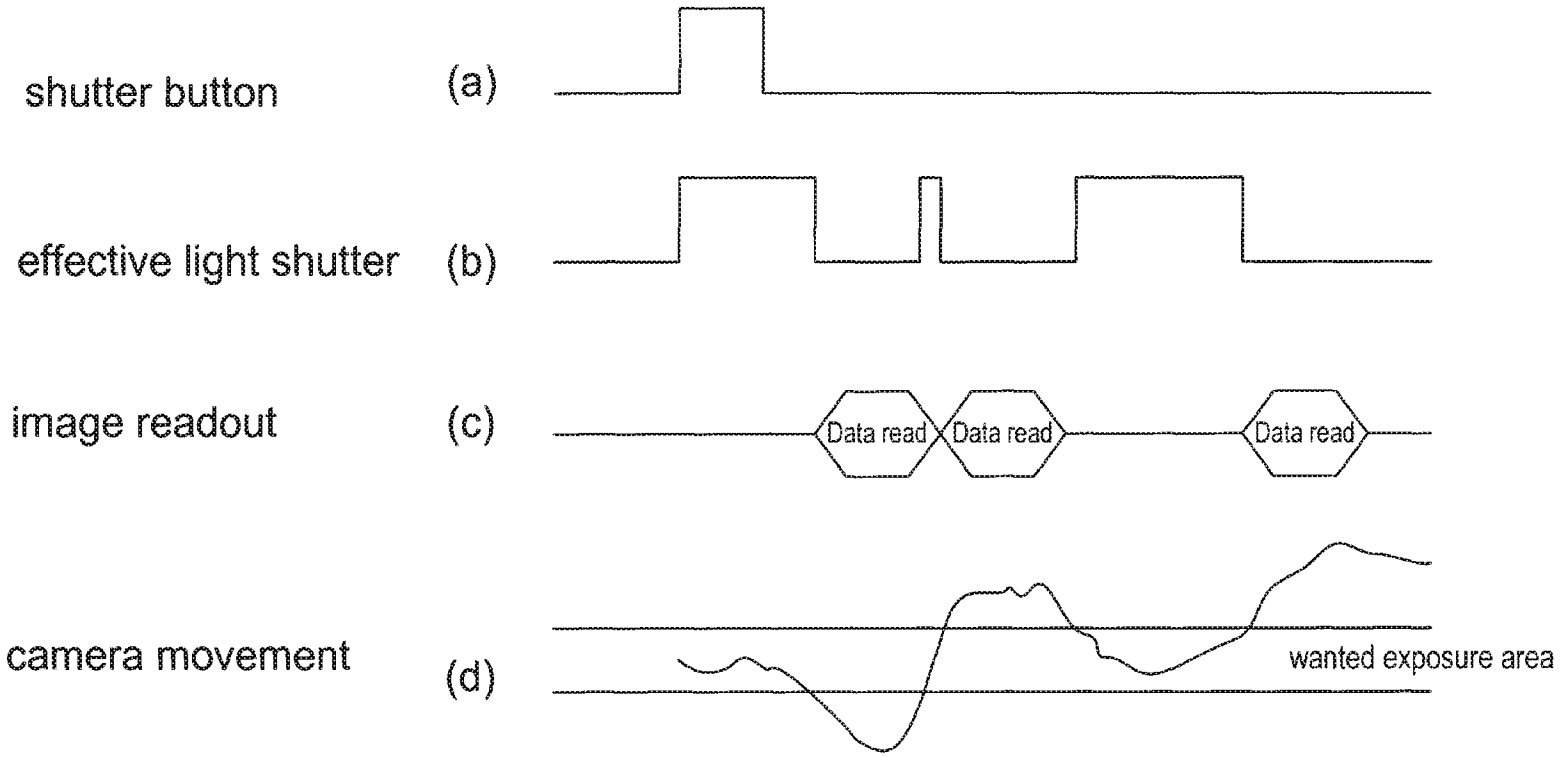
FIG. 6 is a time-chart illustrating how the exposures are read out, according to another embodiment of the present invention.
Figure 7:
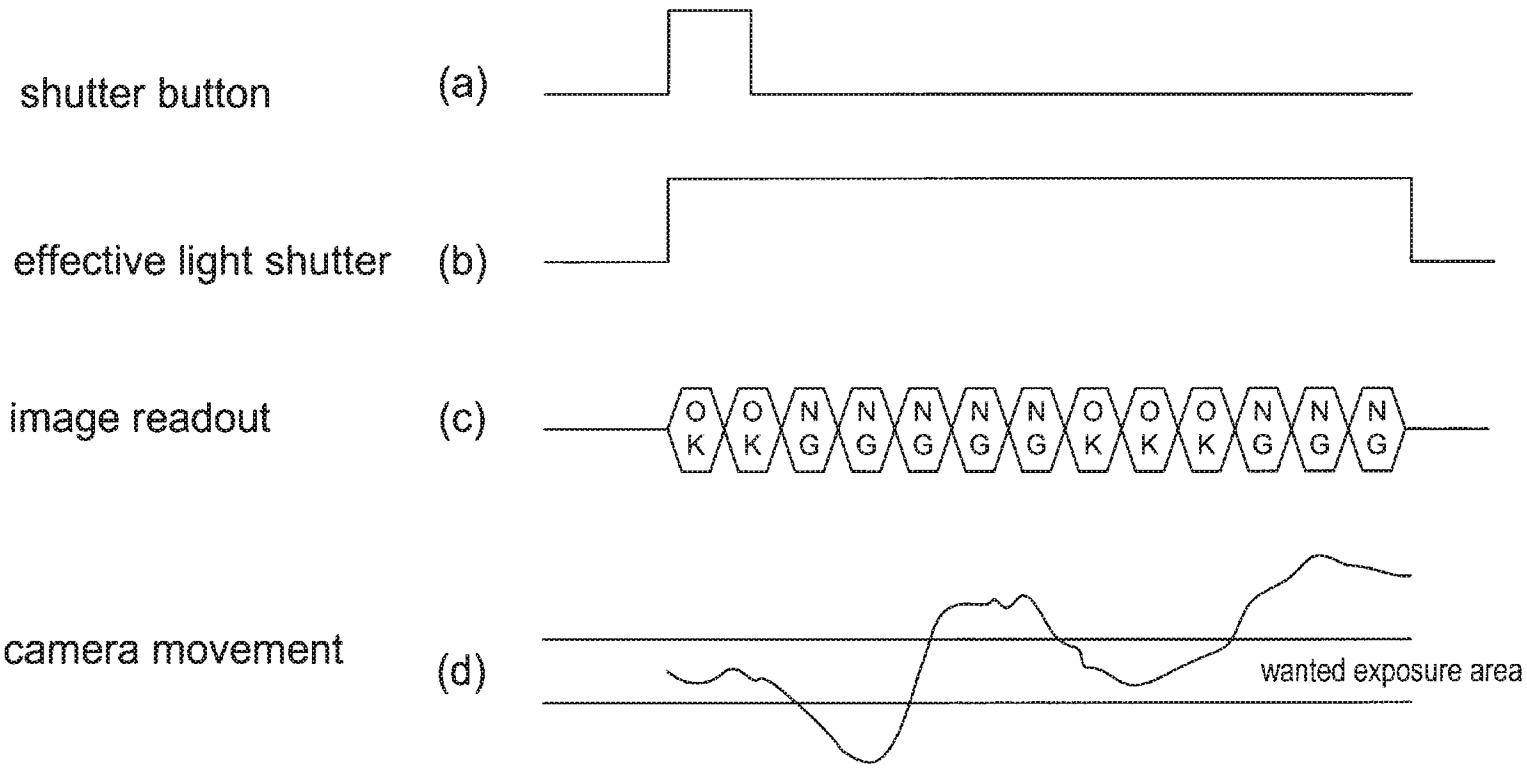
FIG. 7 is a time-chart illustrating how the exposures are read out, according to yet another embodiment of the present invention.

It should be noted that, with the same camera movement, there are more than one way to form a final image, as shown in FIGS. 5 to 7. The camera movement is shown in FIGS. 5(d), 6(d) and 7(d). As shown, some part of the camera movement is within a predetermined range depicted as the "wanted exposure area" (or angle). Only the exposures to the image sensor when the camera movement is within the predetermined range are used. The exposures start when the shutter button on the camera is activated, as shown in FIGS. 5(a), 6(a) and 7(a). In FIGS. 5(b) and 6(b), the image sensor is effectively exposed only when the camera movement is within the predetermined range. If the camera movement is outside the predetermined range, the exposing light is shut off by a mechanical or optical shutter, or by an electronic circuit or a plurality of electronic elements within the image sensor. In an image sensor such as a charge-couple device (CCD), electric charges will accumulate in the pixels over an exposure period to form an image. In general, the accumulated charges in each pixel are read out as pixel intensity. After each exposure period, a frame is captured, as shown in FIG. 6(c). As shown in FIG. 6(d), the track of the camera movement moves out of the wanted exposure area three times and, therefore, there are three exposures after the shutter button is activated. Accordingly, three frames are separately and individually captured to be used in the final image. In this embodiment, the pixel intensities are summed in a processor operatively connected to the image sensor.

Alternatively, only a single frame is read out after the picture is taken, as shown in FIG. 5(c). This single frame effectively sums the pixel intensities in three different exposure periods.

In a different embodiment, the long exposure period for taking a picture is divided into a plurality of short periods and a frame is captured for the exposure in each short period. The image for each captured frame is read out while the picture is taken. As shown in FIG. 7(c), only the frames captured for the exposures when the camera movement is within the predetermined range are used for summing. In FIG. 7(c), the used frames are labeled "OK" and the discarded frames are labeled "NG". In this embodiment, the pixel intensities of the used frames are summed in a processor operatively connected to the image sensor. Although FIG. 7(b) shows an effective light shutter period, no shutter is needed for this embodiment.

In order to select the shorter frames for forming a final image, the present invention uses a motion sensor, such as a gyroscope or an accelerometer, to selectively shut off the image sensor when the camera motion is out of the wanted exposure angular range or out of the wanted exposure area in regard to the initial position. As shown in FIG. 8, the imaging system 10 of the present invention comprises one or more lenses 20 to project an image on the image sensor 30. An image/signal processor 40 is configured to read out the images formed on the image sensor. When the illumination is adequate, one short frame may be sufficient to capture the image of a scene. In a low light situation, many short frames are used to capture a plurality of short exposure images so that the pixel intensities in the short frames can be summed by the image/signal processor 40 to form a final image. A motion sensor 50, operatively connected to the image/signal processor 40, sends a signal to the processor 40 to effectively shut off the image sensor 30 when the camera movement is out of the wanted exposure angular range or the wanted exposure area. The exposing light can be shut off by a mechanical shutter or an optical valve 55, for example.

In many imaging systems, the exposure time varies with the illumination. A longer exposure time is used when the illumination is lower. For that purpose, a light sensor 60 is used. In the imaging system, according to the present invention, the exposure time can also be dependent upon the illumination. Thus, in a low light situation, the exposure time can be increased so as to increase the chance for the track of an image point to pass through the wanted exposure area or angular range. However, it is also possible to increase the wanted exposure angular range or the wanted exposure area in a low light situation.

Figure 9:
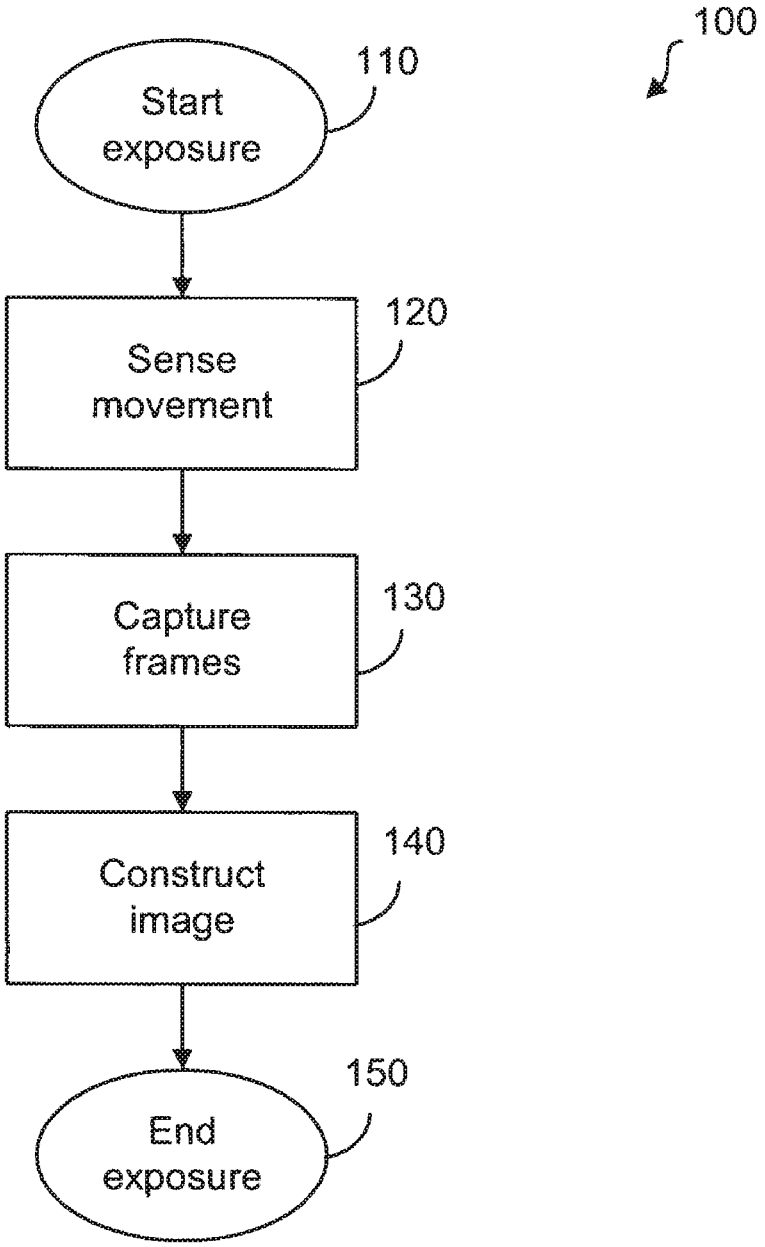
FIG. 9 is a flowchart illustrating the method of image stabilization, according to the present invention.

In sum, the present invention uses a single captured frame or a plurality of captured frames to form a final image. If multiple frames are used to form the final image, the pixel intensity values of the corresponding pixels in the frames are summed in order to obtain the final image. The summing process can be done in the image sensor or in a processor. The overall stabilization process is summarized in a flowchart as shown in FIG. 9. As shown in the flowchart 100 in FIG. 9, the exposures of a projected image to image sensor start at step 110 when the shutter button on the camera is activated. The sensing of the camera movement starts immediately at step 120 in order to determine whether the camera movement is within a wanted exposure area or angle. The image frames are captured at step 130 either during the exposure period or during the exposure period. At step 140, the image frames formed from the exposures when the movement is within the wanted exposure area or angle are used to construct the final image. In one embodiment of the present invention, the projected image is prevented from reaching the image sensor when the movement exceeds the wanted exposure area or angle. It is advantages that the movement of the camera is determined using only a subset of pixels on the image sensor.

The present invention uses a motion sensor to sense the camera movement during the exposure time. If the camera movement exceeds a predetermined range relative to a reference point, then the shorter frames captured during this large movement period are discarded. Alternatively, the image sensor is effectively not exposed during a large movement period. The exposing light can be shut off by a mechanical shutter, by an optical valve or by an electronic circuit in the image sensor. With the frame selection or with the selective exposure method of the present invention, there is no need to optically or electronically shift the images captured in the shorter frames in the pixel fusion process.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

[1. A method comprising:

exposing a projected image on an image sensor of an imaging system during at least part of an exposure period for attaining at least two exposures;

sensing movement of the imaging system, during the exposure period, in order to determine an amount of movement of the imaging system relative to an initial position of the imaging system in the exposure period; and constructing an image based on at least a first exposure and a second exposure, wherein the first exposure is attained during a first time period, within the exposure period, in which the determined amount of movement of the imaging system is within a predetermined movement range relative to the initial position of the imaging system, the second exposure is attained during a second time period, within the exposure period, in which the determined amount of movement of the imaging system is within the predetermined movement range relative to the initial position of the imaging system, and between the first time period and the second time period there is a third time period in which the determined amount of movement of the imaging system is outside the predetermined movement range relative to the initial position of the imaging system.]

[2. A method according to claim 1, wherein the first exposure and the second exposure, attained when the determined amount of movement of the imaging system is within the predetermined movement range relative to the initial position of the imaging system, form a single image frame during the exposure period, said method further comprising:

capturing the single image frame after the exposure period for constructing the acquired image.]

[3. A method according to claim 1, wherein the first exposure and the second exposure, attained when the determined amount of movement of the imaging system is within the predetermined movement range relative to the initial position of the imaging system, separately form at least two image frames during the exposure period, said method further comprising:

capturing the at least two image frames at least during the exposure period for constructing the acquired image.]

[4. A method according to claim 1, wherein the exposure period is divided into a plurality of shorter time periods and wherein the first exposure, attained during the first time period, forms a first image frame; and the second exposure, attained during the second time period, forms a second image frame, said method further comprising:

capturing said first and second image frames during the exposure period; and selecting at least the first image frame and the second image frame for use in constructing the image.]

[5. A method according to claim 1, further comprising preventing the projected image from reaching the image sensor, during the third time period, when the determined amount of movement of the imaging system is outside the predetermined movement range relative to the initial position of the imaging system.]

[6. A method according to claim 1, wherein the image sensor comprises an array of pixels, each pixel having a pixel area, and the predetermined movement range is determined based on one or more pixel areas.]

[7. A method according to claim 1, wherein the imaging system comprises an optical system for providing the projected image on the image sensor, and the predetermined movement range is determined based on a focal distance of the optical system.]

[8. A method according to claim 1, wherein the predetermined movement range is determined based on brightness of at least part of light forming the projected image.]

[9. An imaging system comprising:

an image sensor configured to attain at least a first exposure and a second exposure during an exposure period;

a movement sensor configured to sense movement of the imaging system, during the exposure period, in order to enable an amount of movement of the imaging system to be determined, relative to an initial position of the imaging system in the exposure period; and a processor configured to construct an image based on at least the first exposure and the second exposure, wherein the first exposure is attained during a first time period, within the exposure period, in which the determined amount of movement of the imaging system is within a predetermined movement range relative to the initial position of the imaging system, the second exposure is attained during a second time period, within the exposure period, in which the determined amount of movement of the imaging system is within the predetermined movement range relative to the initial position of the imaging system, and between the first time period and the second time period there is a third time period in which the determined amount of movement of the imaging system is outside the predetermined movement range relative to the initial position of the imaging system.]

[10. An imaging system according to claim 9, wherein the first exposure and the second exposure, attained when the determined amount of movement of the imaging system is within the predetermined movement range relative to the initial position of the imaging system, form a single image frame during the exposure period, and wherein the image is constructed based on the single image frame captured after the exposure period.]

[11. An imaging system according to claim 9, wherein the first exposure and the second exposure, attained when the determined amount of movement of the imaging system is within the predetermined movement range relative to the initial position of the imaging system, separately form at least two image frames during the exposure period, and wherein the image is constructed based on the at least two image frames captured at least during the exposure period.]

[12. An imaging system according to claim 9, wherein the image sensor is configured to divide the exposure period into a plurality of shorter time periods and the first exposure, attained during the first time period, forms a first image frame; and the second exposure, attained during the second time period, forms a second image frame, and wherein the processor is configured to capture the first and second and third image frames during the exposure period, configured to select the first image frame and the second image frame for use in constructing the image.]

[13. An imaging system according to claim 9, further comprising an optical system for providing a projected image on the image sensor so as to allow the image sensor to attain the first exposure and the second exposure during the exposure period.]

[14. An imaging system according to claim 13, further comprising a shutter, positioned in relationship to the optical system, configured to prevent the projected image from reaching the image sensor during the third time period, when the determined amount of movement of the imaging system is outside the predetermined movement range relative to the initial position of the imaging system.]

[15. An imaging system according to claim 9, further comprising an electronic circuit configured to prevent the image sensor from attaining the third exposure during the third time period, when the determined amount of movement of the imaging system is outside the predetermined movement range relative to the initial position of the imaging system.]

[16. An imaging system according to claim 9, wherein the movement sensor provides a signal to indicate that the determined amount of movement of the imaging system is within the predetermined movement range so as to cause the image sensor to attain said first exposure during the first time period and so as to cause the image sensor to attain said second exposure during the second time period.]

[17. An imaging system, comprising:

means for sensing an image;

means for exposing a projected image on the image sensing means during an exposure period so as to allow the image sensing means to attain at least two exposures;

means for sensing movement of the imaging system, during the exposure period, in order to determine an amount of movement of the imaging system relative to an initial position of the imaging system in the exposure period; and means for constructing an image based on at least a first exposure and a second exposure, wherein the first exposure is attained during a first time period, within the exposure period, in which the determined amount of movement of the imaging system is within a predetermined movement range relative to the initial position of the imaging system, the second exposure is attained during a second time period, within the exposure period, in which the determined amount of movement of the imaging system is within the predetermined movement range relative to the initial position of the imaging system, and between the first time period and the second time period there is a third time period in which the determined amount of movement of the imaging system is outside the predetermined movement range relative to the initial position of the imaging system.]

[18. An imaging system according to claim 17, further comprising means for capturing at least two image frames for constructing the acquired image.]

[19. An imaging system according to claim 18, further comprising:

means for selecting the captured image frames for constructing the acquired image.]

[20. An imaging system according to claim 17, further comprising:

means for preventing the projected image from forming an exposure, during the third time period, when the determined amount of movement of the imaging system is outside the predetermined movement range relative to the initial position of the imaging system.]

*21. A method comprising:*

*exposing a projected image on an image sensor of an imaging system during multiple exposures to capture multiple frames;*

*tracking, by a movement sensor, a movement of the imaging system during the multiple exposures to generate a track of the imaging system, at least a portion of the track of the imaging system being within a predetermined movement range relative to an initial position of the imaging system;*

*defining an exposure area around said initial position of the imaging system;*

*identifying a plurality of instances when the track passes through the exposure area and at least one instance when the track does not pass through the exposure area,*

*wherein the captured multiple frames comprise a first image captured during a first time period, a second image captured during a second time period, and a third image captured during a third time period, the second time period occurring between the first time period and the third time period, the movement of the imaging system being within the predetermined movement range during the first time period and the third time period, and the movement of the imaging system being outside the predetermined movement range during the second time period; and*

*forming a final image of the projected image based on frames captured during at least the first time period and the third time period, and excluding frames captured during the second time period.*

*22. The method of claim 21 wherein said tracking is performed using at least one of a gyroscope and an accelerometer.*

*23. The method of claim 21 wherein said exposure area is one pixel.*

*24. An imaging system comprising:*

*an image sensor configured to capture multiple frames during multiple exposures;*

*a movement sensor configured to track a movement of the imaging system to generate a track of the imaging system, at least a portion of the track of the imaging system being within the predetermined movement range relative to an initial position of the imaging system; and*

*an image and signal processor configured to:*

*define an exposure area around said initial position of the imaging system;*

*identify a plurality of instances when the track passes through the exposure area and at least one instance when the track does not pass through the exposure area,*

*wherein the captured multiple frames comprise a first image captured during a first time period, a second image captured during a second time period, and a third image captured during a third time period, the second time period occurring between the first time period and the third time period, the movement of the imaging system being within the predetermined movement range during the first time period and the third time period, and the movement of the imaging system being outside the predetermined movement range during the second time period; and*

*form a final image of a projected image based on frames captured during at least the first time period and the third time period, and exclude frames captured during the second time period.*

*25. The imaging system of claim 24, wherein the movement sensor comprises at least one of a gyroscope and an accelerometer.*

*26. The imaging system of claim 24, wherein said exposure area is one pixel.*

*27. A non-transitory computer-readable memory comprising executable instructions adapted to direct an imaging system to perform:*

*exposing a projected image on an image sensor of the imaging system during multiple exposures to capture multiple frames;*

*tracking a movement of the imaging system during the multiple exposures to generate a track of the imaging system, at least a portion of the track of the imaging system being within a predetermined movement range relative to an initial position of the imaging system;*

*defining an exposure area around said initial position of the imaging system;*

*identifying a plurality of instances when the track passes through the exposure area and at least one instance when the track does not pass through the exposure area,*

*wherein the captured multiple frames comprise a first image captured during a first time period, a second image captured during a second time period, and a third image captured during a third time period, the second time period occurring between the first time period and the third time period, the movement of the*

*imaging system being within the predetermined movement range during the first time period and the third time period, and the movement of the imaging system being outside the predetermined movement range during the second time period; and*

*forming a final image of the projected image based on frames captured during at least the first time period and the third time period, and excluding frames captured during the second time period.*

*28. The non-transitory computer-readable memory of claim 27, wherein said executable instructions for tracking the movement of the imaging system control at least one of a gyroscope and an accelerometer.*

*29. The non-transitory computer-readable memory of claim 27, wherein said exposure area is one pixel.*

* * * * *